Sept. 29, 1964 C. BELSKY 3,150,408
VEHICLE DOOR HINGE
Filed April 4, 1961 2 Sheets-Sheet 1

CHARLES BELSKY
INVENTOR.

BY *John C. Faulkner*
*John J. Roethel*

ATTORNEYS

CHARLES BELSKY
INVENTOR.

BY *John R. Faulkner*
*John J. Roethel*

ATTORNEYS

United States Patent Office 3,150,408
Patented Sept. 29, 1964

3,150,408
VEHICLE DOOR HINGE
Charles Belsky, Detroit, Mich., assignor to Ford Motor
Company, Dearborn, Mich., a corporation of Delaware
Filed Apr. 4, 1961, Ser. No. 100,629
4 Claims. (Cl. 16—163)

This invention relates generally to body construction for automotive vehicles and has particular reference to improved hinge means for swingably mounting vehicle doors on vehicle bodies.

Vehicle body stylists have indicated interest in a vehicle body configuration in which the roof is relatively narrow and the door glass is tilted or curved inwardly at the top at a substantially greater angle than that now being used on the prseent day automobile. This greater angle or tumblehome of the plane of the door creates a problem in hinging the door so that there is no diminution of the entrance room into the vehicle body over that now obtainable with conventional vehicle doors and conventional hinging methods.

If a vehicle door having the proposed greater tumblehome and accompanying curved or tilted door glass is hinged in a conventional manner, movement of the door to an open position with the window raised creates an awkward tunnel-like entrance to the passenger compartment. The vehicle door hinging means embodying the present invention is constructed and arranged to cause an outward rocking movement of the upper part of the door as it swings open. The effect of the outward rocking movement is to cause a movement of the upper edge of the door glass or door glass frame away from the contiguous roof structure. The tunnel effect is thus diminished permitting a more upright entrance to the passenger compartment to be achieved by the prospective passenger.

The hinge means embodying the present invention may be briefly described as a first hinge device supporting the closure or vehicle door on the vehicle door for movement about a single point, i.e., the first hinge device permits limited universal movement of the closure relative to the vehicle body, such as may be obtained with a ball and socket type hinge. A second hinge device, spaced from the first hinge device, completes the attachment of the closure to the body. The second hinge device includes means controling the swinging movement of the closure to provide in predetermined sequence both single hinge line swinging movement and rocking movement of the closure about said single point as said closure moves between its ends positions. The end positions relative to the body opening with which the closure is associated are the fully open or fully closed positions.

Other objects and advantages of the present invention will be made more apparent as this description proceeds, particularly when considered in connection with the accompanying drawings, wherein.

Figure 3:
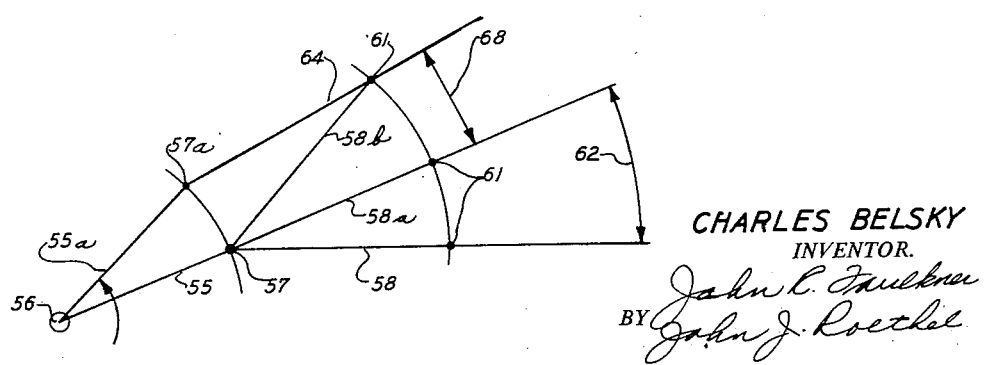

FIG. 3 diagrammatically illustrates the movement pattern of the hinge links of the movement control hinge device embodied in the hinge means of the present invention.

Figure 1:
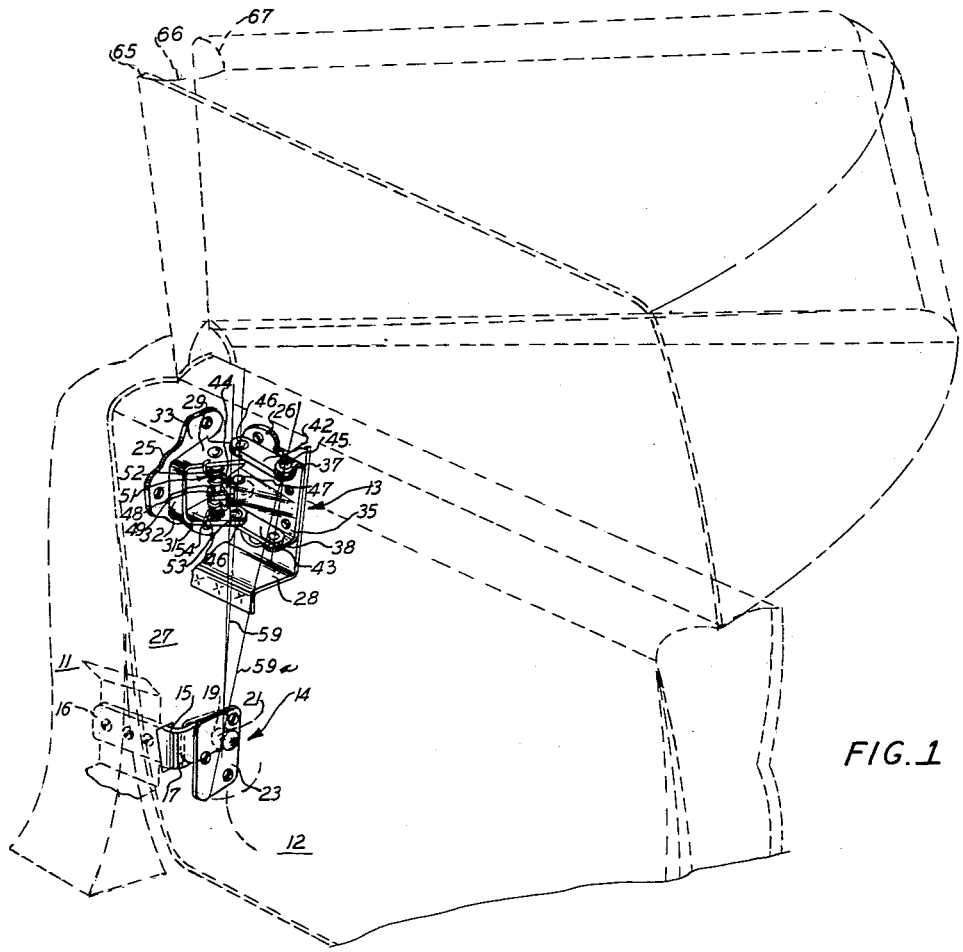
FIG. 1 is a diagrammatic perspective view showing the hinge means embodying the present invention related to a door and door framing structure of a vehicle body.

Referring now more particularly to the drawings, it will be noted that FIG. 1 illustrates a portion of a vehicle body member 11 having a vehicle door 12 hingedly supported thereon.

The hinge means supporting the door 12 on the body structure 11 comprises an upper and a lower hinge device, generally designated 13 and 14, respectively. The upper hinge device 13 is illustrated as an articulated hinge device; the lower hinge device 14 is illustrated as a single point or universal position ball and socket hinge device.

Figure 2:
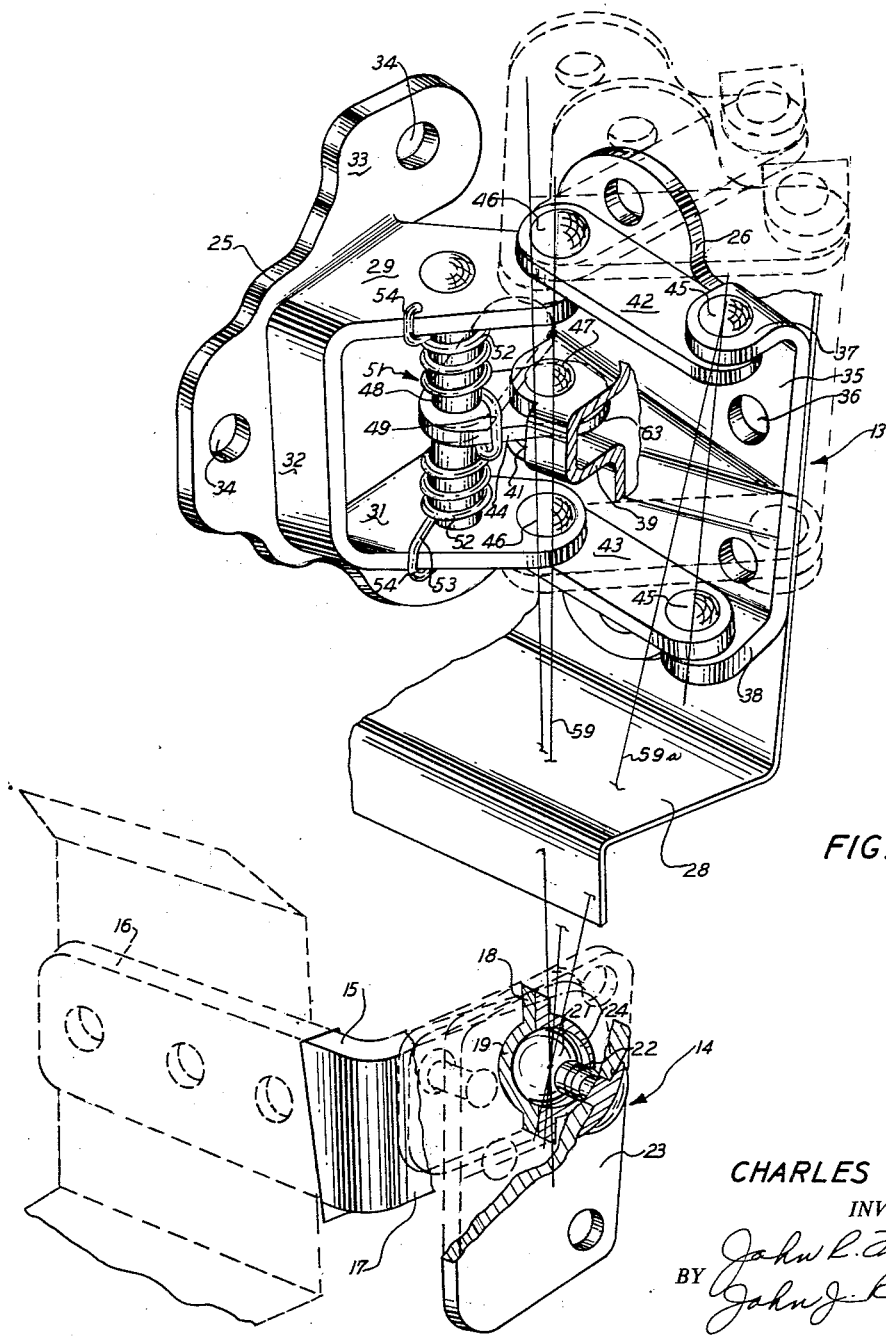
FIG. 2 is an enlarged perspective view of the hinge means.

As seen in greater detail with reference to FIG. 2, the lower or ball and socket hinge device 14 comprises a gooseneck member 15 which is substantially L-shaped. One leg 16 of the L-shaped gooseneck member forms an attaching leaf adapted to be secured to the body structure. The other leg 17 of the gooseneck member has a a backing plate 18 riveted to its rear face, the end of the leg 17 and the backing plate 18 having a ball receiving socket 19 formed therein. The socket 19 receives a ball head 21 carried on a shank 22 which extends normally to the surface of a mounting plate 23. The mounting plate is arranged to be bolted or otherwise securely fastened to an end wall of the vehicle door. The shank 22 supporting the ball head 21 extends through a slot 24 in the socket end of the gooseneck member leg 17 so as to allow pivotal movement of the ball head and its shank in the socket 19 and, thereby, swinging movement of the door relative to the body structure.

Universal position ball and socket hinge devices as applied to vehicle doors are known in the prior art. Reference may be made to U.S. Patent 2,200,311 for an exemplification of such a hinge device. Accordingly, the foregoing brief description of the ball and socket hinge device 15 is believed sufficient for an understanding of the present invention.

The upper hinge device 13 comprises a pair of brackets, generally designated 25 and 26, respectively. The brackets are adapted to be mounted in opposed relationship to each other, the bracket 25 on the end wall or jamb face 27 of the body structure member 11 framing the door opening and the bracket 26 on a support member 28 adapted to be welded to the inner panel support structure of the vehicle door. In closed position of the door the brackets are positioned at substantially right angles to each other. It will be readily understood that a suitable opening in the end wall of the door is provided to permit the two brackets to be coupled together by the hinge elements, to be described.

The hinge bracket 25 has spaced upper and lower walls 29 and 31 joined by a vertical wall 32. The upper and lower walls 29 and 31 are parallel to each other and normal to the plane of the base 33 of the bracket. The base 33 has spaced apertures 34 adapted to receive the necessary bolts or other fasteners for securing the bracket to the end wall 27 of the body structure.

The hinge bracket 26 has a base plate 35 provided with suitable apertures 36 adapted to receive bolts or other fasteners for securing this bracket to the support bracket 28. The base plate 35 is provided with spaced ears 37 and 38. These ears extend in a direction normal to the plane of the base plate and are located at the end of the base plate away from bracket 25. The base plate is also provided with a longitudinally extending, tapered, inverted U-shaped rib 39, the side walls of which are substantially perpendicular to the plane of the base plate 35. This rib 39 is substantially centrally located between the ears 37 and 38 and the direction of taper away from the base plate is from the base plate end having the ears 37 and 38 toward the bracket 25. This rib 39 has a deep notch 41 at its end closest to the bracket 25.

The two brackets 25 and 26 are hingedly coupled to each other by a system of links. These comprise links 42, 43 and 44. Link 42 is pivotally connected at one end by a suitable rivet 45 to the ear 37 of the bracket 26 and at its other end to the extremity of the wall 29 of the bracket 25 by a suitable rivet 46. Link 43 is similar to link 42 and is pivotally coupled at its ends to the ear 38 and extremity of wall 31 of the bracket 26 and 25, respectively.

The link 44 is a relatively short link and is pivotally supported at one end on a short pivot stud 47 extending between the side walls of rib 39 of the base 35 of the bracket 26, the link extending through the notch 41 in the rib 39. The other end of the link 44 is pivotally journalled on an elongated pivot stud 48 extending between the parallel walls 29 and 31 of the bracket 25.

The link 44 is engaged by the center U-shaped crank section 49 of a torsion spring 51. The torsion spring has a coiled end section 52 at each side of the center section 49, the coiled end sections being wrapped around the pivot stud 48. Each coiled section terminates in a straight end portion 53 having a hook 54 hooked over the bracket walls 29 and 31, respectively. The direction of action of spring 51 on the link 44 is such as to urge the latter outwardly or in a counterclockwise direction as viewed in FIGS. 1 and 2.

The geometry of the hinge action of the upper hinge device 13 may best be explained with reference to FIG. 3 in which the various links and pivot axes are diagrammatically represented. In FIG. 3 the line 55 represents the longitudinal axis of the hinge link 44. The point 56 represents the pivot axis of the link 44 defined by the pivot stud 48 and the point 57, the pivot axis defined by the stud 47. The line 58 represents the longitudinal axes of the parallel links 42 and 43. The point 57, above-mentioned, also represents the pivot axes of the pivot studs 46 coupling the links 42 and 43 to the bracket 25. This is because the pivot studs 46 and the pivot stud 47 lie on a common center line 59. The common center line 59 is shown in FIG. 2 as also passing through the center of the ball head 24 of the lower hinge device 14. This common center line provides what may hereinafter be referred to as the single or fixed hinge line about which the closure swings during part of its movement between closed and opened end positions and vice versa, i.e., between fully closed position in the body opening and fully opened position relative to the body opening. The pivotal connection of the links 42 and 43 to the ears 37 and 38, respectively, of the bracket 26 is represented by the point 61.

When the vehicle door is in a closed position, i.e., with the upper and lower hinge devices 13 and 14 as shown in solid outline in FIGS. 1 and 2, the relationship of the link 44 to the links 42 and 43 is as diagrammatically represented by the lines 55 and 58, respectively, of FIG. 3. When the door is unlatched and pulled in an opening direction it swings about the single hinge line or center line 59 until an intermediate position is reached. The single hinge line swinging movement is represented in FIG. 3 as the movement of the line 58 in a counterclockwise direction about the point 57 through the arc 62 to the position designated by the line 58a.

As the vehicle door approaches the position in which the links 42 and 43 reach the position designated by the line 58a, the inner surface of the base rib 39 engages the tip 63 of the link 44 (see FIG. 2). This action with the assistance of the force exerted by the torsional spring 51 starts link 44 from the position indicated by the line 55 in a counterclockwise direction about the pivot point 56 toward the position indicated by the line 55a.

The result of the foregoing is that once the intermediate position of opening movement of the door is reached, as determined by the initiation of movement of the link 44, the single hinge line movement about the center line 59 is replaced by movement about a hinge axis or center line represented diagrammatically by the line 59a. As will be readily apparent, the line 59a represents a shiftable hinge axis which swings about the center of the ball 21. This hinge axis swings outwardly of the vehicle body as the door is moved from a closed to an opened position since its movement is tied in to the swinging movement of the links 42 and 43 which swing at all times about the single hinge line or common center line 59.

The movement of the door away from the vehicle body as its swinging movement is shifted from the single or fixed hinge axis 59 to the shiftable hinge axis 59a may be explained with reference to the relationship of the links 42 and 43 to the base 35 of the bracket 26. As seen in FIG. 2, the plane of the base 35 in door closed position is substantially parallel to the longitudinal axes of the links 42 and 43. It should be understood that the lines 58 and 58a in FIG. 3 also represent the plane of the base 35 of the bracket 26. During the single hinge line swinging movement about the pivot designated by the point 57, the plane of the base 35 maintains its substantially parallel position relative to the longitudinal axes of the links 42 and 43. When the link 44 begins to swing, however, this substantially parallel relationship of the plane of the base 35 to the longitudinal axes of the links 42 and 43 is disturbed. The links 42 and 43 continue to swing about the pivot studs 46, or, as diagrammatically represented in FIG. 3, the line 58 continues to swing about the center 57 until in fully door open position it reaches the position designated by the line 58b. As the link 44 swings in a counterclockwise direction from the position designated by the line 55 to the position designated by the line 55a it in effect causes the pivot stud 47 to be pushed outwardly from the vehicle body as it swings about the axis of the pivot stud 48. This is diagrammatically represented in FIG. 3 by the representation of the swinging movement of the line 55 to the position indicated by the line 55a and the pivot stud 47 as moving from the point 57 to the point 57a. The result is that the base plate 35 assumes the relationship indicated by the line 64 in FIG. 3. In effect, the line 64 moves in a substantially parallel relationship outwardly away from the position represented by the line 58a. This outward movement of the base plate 35 is of course reflected in a movement of the upper portion of the vehicle door away from the vehicle body.

This action of the upper hinge must, of course, be considered in conjunction with the lower hinge. The movement of the door from the closed position to the intermediate position during which the door is swinging about the single hinge line produces no noticeable difference over the action expected from a conventional hinging of the door. Continued opening movement of the door, however, causes the upper hinge to act in the manner above described. In other words, the upper portion of the door is caused to move outward or away from the vehicle body. This outward movement causes the door to pivot about the ball hinge, moving the top edge of the door window glass away from the roof rail. This movement increases the passenger entrance from thus achieving the purpose of the hinge means disclosed in the present application. This movement is illustrated by the dot and dash outline of FIG. 1. With a conventional door hinging arrangement, the point on the window glass designated 65 would have very little if any movement as the door is swung from a closed to an open position. With the action of the hinge means disclosed in the present application, the point 65 moves for part of its swinging movement through the arc defined by the line 66 or in other words follows a conventional hinge door path of movement. Once the intermediate position is reached there is a reversal of direction of movement of the point 65 so that it follows the path defined by the line 67 which is a movement outwardly and away from the vehicle body as represented by the distance 68 in FIG. 3. The door is actually caused to lean outwardly away from the body thus destroying the tunnel-like effect which would be achieved with a conventional hinge in an arrangement wherein the door is provided with an inwardly curved glass at the upper portion thereof.

It will be understood that the movement of the door or closure from an open to a closed position causes a reverse sequence of hinge actions to occur.

It will be understood that the invention is not to be limited to the exact construction shown and described, but that various changes and modifications may be made without departing from the spirit and scope of the invention, as defined in the appended claims.

I claim:

1. A hinge for swingably mounting a closure for movement on a vehicle body between a closed, an intermediate and an opened position, said hinge comprising a first bracket mounted on said vehicle body and a second bracket mounted on said closure, link means coupling said brackets together, said link means comprising a pair of elongated links and a control link, each of said links being pivotally connected at one end to said first bracket and at its other end to said second bracket, said second bracket having a planar base attached to said closure, the longitudinal axes of said elongated links in closed position of said closure lying in substantially parallel relation to the plane of said base, the pivotal connection of said elongated links to said first bracket and the pivotal connection of said control link to said second bracket having a common pivot axis, said elongated links and said control link being relatively swingable about said common pivot axis during movement of said closure from said closed to said intermediate position while being maintained in relatively stationary relationship to said second and first brackets, respectively, said elongated links continuing to swing about said common pivot axis as said closure is swung from said intermediate to said opened position, and means operative to drive said control link at said intermediate position in a direction to swing the base of said bracket relative to said elongated links in a direction to move said second bracket and thereby said closure away from said vehicle body as it moves from said intermediate to said opened position.

2. A hinge for swingably mounting a closure for movement on a vehicle body between a closed, an intermediate and an opened position, said hinge comprising a first bracket mounted on said vehicle body and a second bracket mounted on said closure, link means coupling said brackets together, said link means comprising a pair of elongated links and a control link, each of said links being pivotally connected at one end to said first bracket and at its other end to said second bracket, said second bracket having a planar base attached to said closure, the longitudinal axes of said elongated links in closed position of said closure lying in substantially parallel relation to the plane of said base, said elongated links being spaced from one another and the control link being interposed therebetween, the pivotal connection of said elongated links to said first bracket and the pivotal connection of said control link to said second bracket defining a common pivot axis, said elongated links and said control link being relatively swingable about said common pivot axis during movement of said closure from said closed to said intermediate position while being maintained in relatively stationary relationship to said second and first brackets, respectively, said elongated links continuing to swing about said common pivot axis as said closure is swung from said intermediate to said opened position, and means operative at said intermediate position to drive said control link in a direction to swing the base of said second bracket relative to said elongated links in a direction to move said second bracket and thereby said closure away from said vehicle body as it moves from said intermediate to said opened position.

3. A hinge for swingably mounting a closure on a vehicle body for movement between closed and opened positions and relative to an opening in said vehicle body, said hinge comprising a first attachment member mounted on said vehicle body and a second attachment member mounted on said closure, a first link means pivotally coupled at one end to said first attachment member for swinging movement about a first pivot axis and at the other end to said second attachment member for relative swinging movement about a second pivot axis, and control means including a second link means pivotally coupled at one end to said first attachment member for swinging movement about a pivot axis spaced from said first pivot axis and at its other end to said second attachment member for swinging movement relative thereto about a pivot axis which in closed position of said closure coincides with said first pivot axis and remains coincident therewith until said closure has been moved to a predetermined opened position, said control means being constructed and arranged to become operative upon said predetermined opened position of said closure being reached to cause relative swinging movement between said first link means and said second attachment member about said second pivot axis and thereby bodily shifting movement of said second attachment member and said closure laterally away from said first attachment member and said vehicle body until fully opened position of the closure is reached.

4. A hinge for swingably mounting a closure on a vehicle body for movement between a fully closed, an intermediate and a fully opened position and relative to an opening in said vehicle body, said hinge comprising a first attachment member mounted on said vehicle body and a second attachment member mounted on said closure, each of said attachment members having substantially planar base portions which in closed position of the closure lie at substantially right angles to each other, a first link means comprising spaced link elements pivotally coupled at one end to said first attachment member for swinging movement about a first pivot axis and at the other end to said second attachment member for relative swinging movement about a second pivot axis, said spaced link elements in closed position of said closure extending with their longitudinal axes substantially parallel to the planar base portion of said second attachment member, and control means including a second link means pivotally coupled at one end to said first attachment member for swinging movement about a pivot axis spaced from said first pivot axis and at its other end to said second attachment member for swinging movement relative thereto about a pivot axis which in closed position of said closure coincides with said first pivot axis and remains coincident therewith until said closure had been moved to said intermediate position between said fully closed and said fully opened positions, said spaced link elements maintaining their parallel relationship to said second attachment member base portion until said intermediate position is reached, said control means being constructed and arranged to become operative when said intermediate position is reached to cause relative swinging movement between said first link means and said second attachment member about said second pivot axis and thereby bodily shifting movement of said second attachment member and said closure laterally away from said first attachment member and said vehicle body until fully opened position of said closure is reached, the sequence of movement being reversed as said closure is moved from an opened to a closed position.

References Cited in the file of this patent

UNITED STATES PATENTS

| | | | |
|---|---|---|---|
| 694,432 | Selleck | Mar. 4, | 1902 |
| 830,916 | McCuen | Sept. 11, | 1906 |
| 1,987,512 | Leonard | Jan. 8, | 1935 |
| 2,050,469 | Smith | Aug. 11, | 1936 |
| 2,074,112 | Homan | Mar. 16, | 1937 |
| 2,200,311 | Van Voorhees | May 14, | 1940 |
| 2,205,484 | Lindsay | June 25, | 1940 |
| 2,743,476 | Turner | May 1, | 1956 |
| 2,791,348 | Adams | May 7, | 1957 |
| 3,016,261 | Tatter | Jan. 9, | 1962 |